United States Patent
Abari

(10) Patent No.: US 11,567,211 B2
(45) Date of Patent: Jan. 31, 2023

(54) SYSTEMS AND METHODS FOR ESTIMATING VEHICLE SPEED BASED ON RADAR

(71) Applicant: Woven Planet North America, Inc., Los Altos, CA (US)

(72) Inventor: Farzad Cyrus Foroughi Abari, San Bruno, CA (US)

(73) Assignee: WOVEN PLANET NORTH AMERICA, INC., Los Altos, CA (US)

(*) Notice: Subject to any disclaimer, the term of this patent is extended or adjusted under 35 U.S.C. 154(b) by 154 days.

(21) Appl. No.: 16/983,599

(22) Filed: Aug. 3, 2020

(65) Prior Publication Data

US 2021/0041569 A1    Feb. 11, 2021

Related U.S. Application Data

(63) Continuation of application No. 16/237,153, filed on Dec. 31, 2018, now Pat. No. 10,768,307.

(51) Int. Cl.
| | | |
|---|---|---|
| *G01S 17/931* | (2020.01) | |
| *B60W 30/14* | (2006.01) | |
| *G01S 13/86* | (2006.01) | |
| *G08G 1/16* | (2006.01) | |
| *G06V 20/58* | (2022.01) | |
| *G01S 13/931* | (2020.01) | |

(52) U.S. Cl.
CPC ......... *G01S 17/931* (2020.01); *B60W 30/146* (2013.01); *G01S 13/865* (2013.01); *G06V 20/58* (2022.01); *G08G 1/166* (2013.01); *B60W 2554/00* (2020.02); *G01S 2013/932* (2020.01)

(58) Field of Classification Search
None
See application file for complete search history.

(56) References Cited

U.S. PATENT DOCUMENTS

| | | |
|---|---|---|
| 2017/0061637 A1 | 3/2017 | Ma |
| 2017/0115387 A1 | 4/2017 | Luders et al. |
| 2017/0372602 A1 | 12/2017 | Gilliland et al. |
| 2018/0095171 A1* | 4/2018 | Cuichun ............... G01S 17/66 |
| 2018/0251092 A1 | 9/2018 | Lee et al. |
| 2019/0092330 A1* | 3/2019 | Ide ....................... G01S 13/867 |

* cited by examiner

*Primary Examiner* — Whitney Moore
(74) *Attorney, Agent, or Firm* — Christopher G. Darrow; Darrow Mustafa PC

(57) ABSTRACT

Systems, methods, and other embodiments relate to determining the speed of a vehicle. In one embodiment, a method includes receiving a first frame of data generated by a first sensor of a vehicle, the first frame of data including a first set of angular positions associated with a first set of objects in the environment. The method includes receiving a second frame of data generated by a second sensor of the vehicle, the second frame of data including a second set of angular positions associated with a second set of objects in the environment. The method includes generating a speed estimate for the vehicle in relation to the first set of objects and the second set of objects based at least in part on the first set of angular positions of the first frame of data and the second set of angular positions of the second frame of data.

20 Claims, 10 Drawing Sheets

SYSTEMS AND METHODS FOR ESTIMATING VEHICLE SPEED BASED ON RADAR

CROSS-REFERENCE TO RELATED APPLICATIONS

This application is a continuation of U.S. patent application Ser. No. 16/237,153, filed on Dec. 31, 2018 and entitled "SYSTEMS AND METHODS FOR ESTIMATING VEHICLE SPEED BASED ON RADAR", which is incorporated in its entirety herein by reference.

FIELD OF THE INVENTION

The present technology relates to vehicle systems. More particularly, the present technology relates to systems, apparatus, and methods for determining vehicle operation based on sensors.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to receive data captured by a radar system on a vehicle. A curve is determined based on the data. A speed estimate for the vehicle is generated based on the curve.

In an embodiment, the data captured by the radar system on the vehicle includes a frame of data. The frame of data comprises a plurality of angular positions and a plurality of measured velocities. The plurality of measured velocities comprise a measured velocity at each angular position of the plurality of angular positions.

In an embodiment, the determining the curve based on the data comprises fitting a cosine curve to the plurality of angular positions and the plurality of measured velocities.

In an embodiment, one or more measured velocities associated with one or more moving objects are removed from the frame of data.

In an embodiment, the removing, from the frame of data, one or more measured velocities associated with one or more moving objects comprises removing, from the frame of data, all measured velocities associated with moving objects.

In an embodiment, the one or more measured velocities are identified as being associated with one or more moving objects based on lidar data collected by a lidar system on the vehicle.

In an embodiment, the determining the curve based on the data comprises fitting a cosine curve to the plurality of angular positions and the plurality of measured velocities after the one or more measured velocities associated with one or more moving objects are removed from the frame of data.

In an embodiment, a second frame of data captured by a second radar system on the vehicle is received. A second curve is determined based on the second frame of data. A first vehicle speed estimate is generated based on the curve, and a second vehicle speed estimate is generated based on the second curve. Generating the speed estimate for the vehicle based on the curve comprises generating the speed estimate for the vehicle based on the first vehicle speed estimate and the second vehicle speed estimate.

In an embodiment, the first vehicle speed estimate is associated with a first weight, the second vehicle speed estimate is associated with a second weight, and the generating the speed estimate for the vehicle based on the curve comprises generating the speed estimate for the vehicle based on the first vehicle speed estimate, the second vehicle speed estimate, the first weight, and the second weight.

In an embodiment, the speed estimate is compared with a wheel-rotation-based speed estimate for the vehicle generated by a wheel-rotation-based speedometer on the vehicle. A determination is made that the wheel-rotation-based speedometer requires maintenance based on the comparing the speed estimate with the wheel-rotation-based speed estimate.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
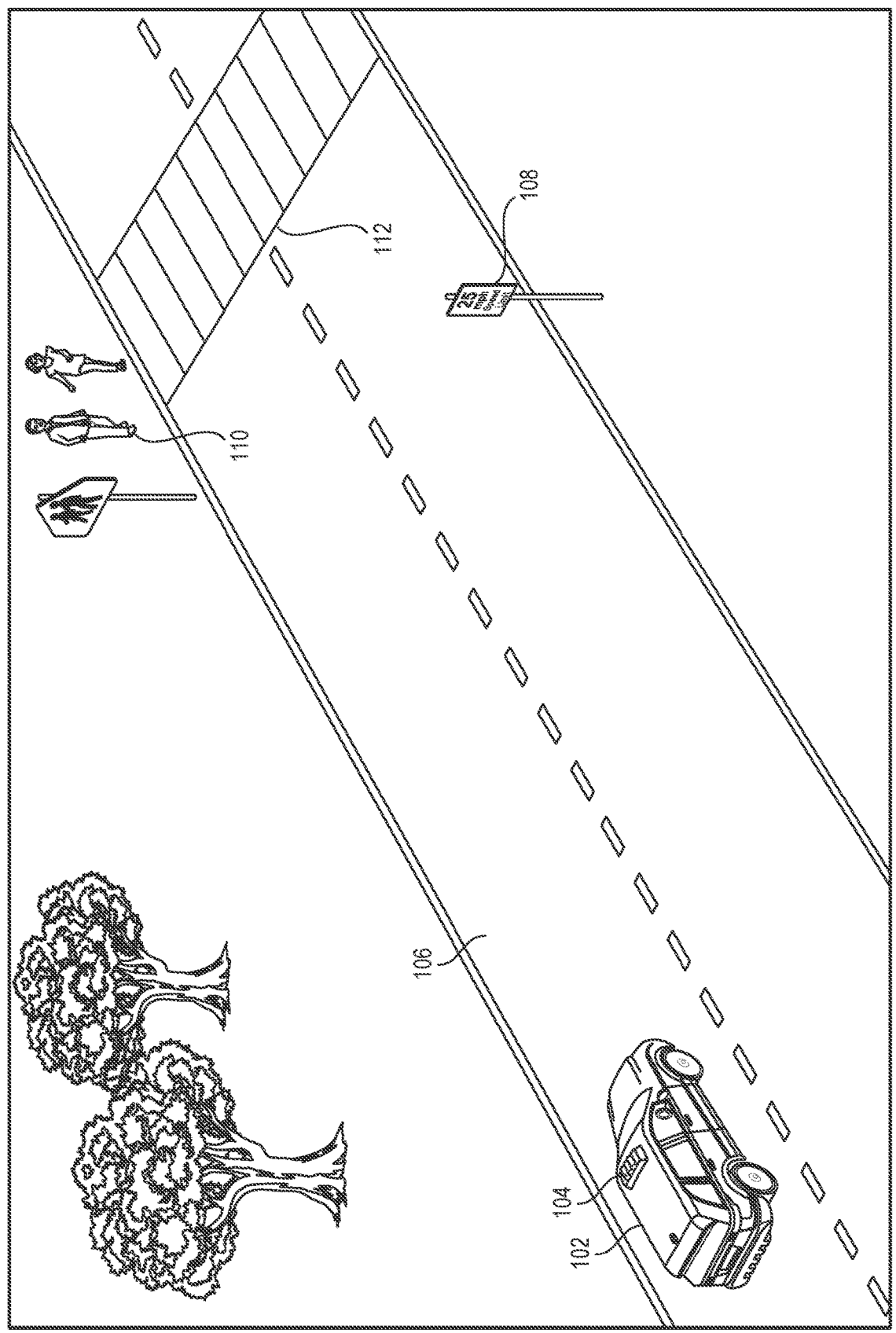
FIG. 1 illustrates an example scenario demonstrating various challenges that may be experienced in conventional approaches to vehicle operation.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems for recognizing hazards, roads, lane markings, traffic signals, etc. Data from sensors may be used to, for example, safely drive the vehicle, activate certain safety features (e.g., automatic braking), and generate alerts about potential hazards.

Whether a vehicle is autonomously, semi-autonomously, or manually driven, it is important to have an accurate measure of vehicle operation, such as speed. FIG. 1 illustrates an example scenario that is illustrative of various challenges that may be experienced using conventional approaches. In FIG. 1, a vehicle 102 includes a sensor suite 104 and is driving down a road 106. In certain instances, the vehicle 102 may be a manually driven vehicle, and the sensor suite 104 may provide feedback to a driver of the vehicle, or the sensor suite 104 may be used to implement one or more safety features, such as automatic braking. With manually driven vehicles, it is important for a driver to know, to a reasonable degree of accuracy, the speed of the vehicle 102. For example, the driver may need to keep the speed of the vehicle below a posted speed limit, or the speed of the vehicle may provide the driver with some indication of how much pressure to apply to the brakes in order to stop at a crosswalk 112. In another example, an automatic braking feature on the vehicle may rely on a reasonably accurate measure of the speed of the vehicle in order to know when and how brakes should automatically be applied to achieve a desired stop or reduced speed.

In certain instances, the vehicle 102 may be an autonomous or semi-autonomous vehicle. In autonomous or semi-autonomous vehicles, an accurate measure of a vehicle's speed is arguably even more important, as a computing system on the vehicle may make numerous driving decisions which are dependent on the vehicle speed. For example, the vehicle 102 may, using one or more sensors in the sensor suite 104, detect the presence of pedestrians 110 about to cross a crosswalk 112. In order to come to a complete stop just before the crosswalk 112, the vehicle 102 must know the speed of the vehicle in order to apply the proper amount of deceleration. If the vehicle 102 does not have an accurate measure of the speed of the vehicle, the decisions made by the vehicle computing system may be premised on incorrect assumptions, and could result in suboptimal vehicle operation and potentially pose safety hazards.

Under conventional approaches, vehicle speed can be estimated based on vehicle tire radius and a rate of rotation of the tires on the vehicle. The radius, which can be specified by its manufacturer, can be used to calculate tire circumference, and the circumference and rate of rotation can be translated into a linear vehicle speed. However, this conventional approach is not particularly accurate even in ideal conditions and, in certain instances, can provide very inaccurate results. For example, if a vehicle is stuck in a pothole, or if the vehicle's tires are not properly gripping the road, the rate of tire rotation may not accurately translate into linear speed. Or, in another example, if a vehicle's tires are overinflated or underinflated, or the tires have worn down, the specified tire radius may not accurately represent the actual radius of the vehicle's tires, resulting in an inaccurate speed estimate.

In certain conventional approaches, a GPS system and/or one or more inertial measurement units (IMUs) on a vehicle can be used to estimate vehicle speed. However, such approaches rely on consistently accurate GPS signals which accurately convey the geographic position of the vehicle. In certain areas, accurate GPS signals may be unavailable, rendering these conventional approaches ineffective in such areas.

Conventional approaches thus pose disadvantages. Given the importance of accurately measuring the speed of a vehicle, it is an important consideration to have as much redundancy as possible to accurately estimate vehicle speed. If certain odometer and/or speedometer options are unavailable, such redundancy enables other odometer and/or speedometer options to be used to reliably estimate vehicle speed and thereby support optimal vehicle performance. The need for accurate estimation of vehicle speed and related redundancy is particularly significant in the fields of autonomous and semi-autonomous vehicles.

An improved approach in accordance with the present technology overcomes the foregoing and other disadvantages associated with conventional approaches. The improved approach can utilize data collected by one or more radar systems on a vehicle to estimate the speed of the vehicle. In general, a radar system can generate or measure frames of data representing an environment detected by the radar system, including objects in the environment. Each frame of data can include a plurality of angular positions relative to the radar system and, for each angular position of at least a subset of the plurality of angular positions, a measured velocity measured by the radar system at the angular position. For each angular position of the plurality of angular positions, the radar system may attempt to measure a measured velocity. It may be the case that certain angular positions in a frame of data may not have associated measured velocities due to the absence of a measurable object located at those angular positions. For example, at a first angular position, a radar system may detect a first object and measure a first velocity based on the detected first object, while at a second angular position, the radar system may not detect any object, and may not be able to measure any velocity at that angular position. As such, a frame of data may include one or more angular positions associated with measured velocities, and also one or more angular positions that do not have an associated measured velocity. If all objects around a vehicle are stationary, the Doppler effect indicates that the measured velocity at a given angular position, θ, will be proportional to the speed of the vehicle multiplied by cosine(θ). In other words, it can be understood that, for any stationary object: $v_{measured} \propto v_{vehicle} * \cos(\theta)$, where θ is an angular position relative to the radar system, $v_{measured}$ is a measured velocity measured by the radar system at the angular position, and $v_{vehicle}$ is a speed of the vehicle. Utilizing the assumption that many or most of the objects in a frame of data detected by the radar system will be stationary objects, a cosine curve can be fitted to the plurality of angular position/measured velocity pairs associated with the objects in the frame of data. The fitted cosine curve can be used to generate a speed estimate of the vehicle. Although a cosine curve is discussed as an example herein, the present technology includes other types of curves. For example, in some embodiments, other trigonometric curves, such as a sine curve adapted to yield the same values of a cosine curve, can be used to generate vehicle speed. In certain embodiments, a radar system may collect a frame of data multiple times a second (e.g., approximately every 50 ms). Each frame of data can be used to update the speed estimate, such that the speed estimate of the vehicle can be generated multiple times a second. In certain embodiments, a vehicle can include multiple radar systems, each collecting frames of data independently from the other radar systems. Vehicle speed estimates can be generated based on the frames of data being collected by the multiple radar systems. More details relating to the present technology are provided below.

Figure 2:
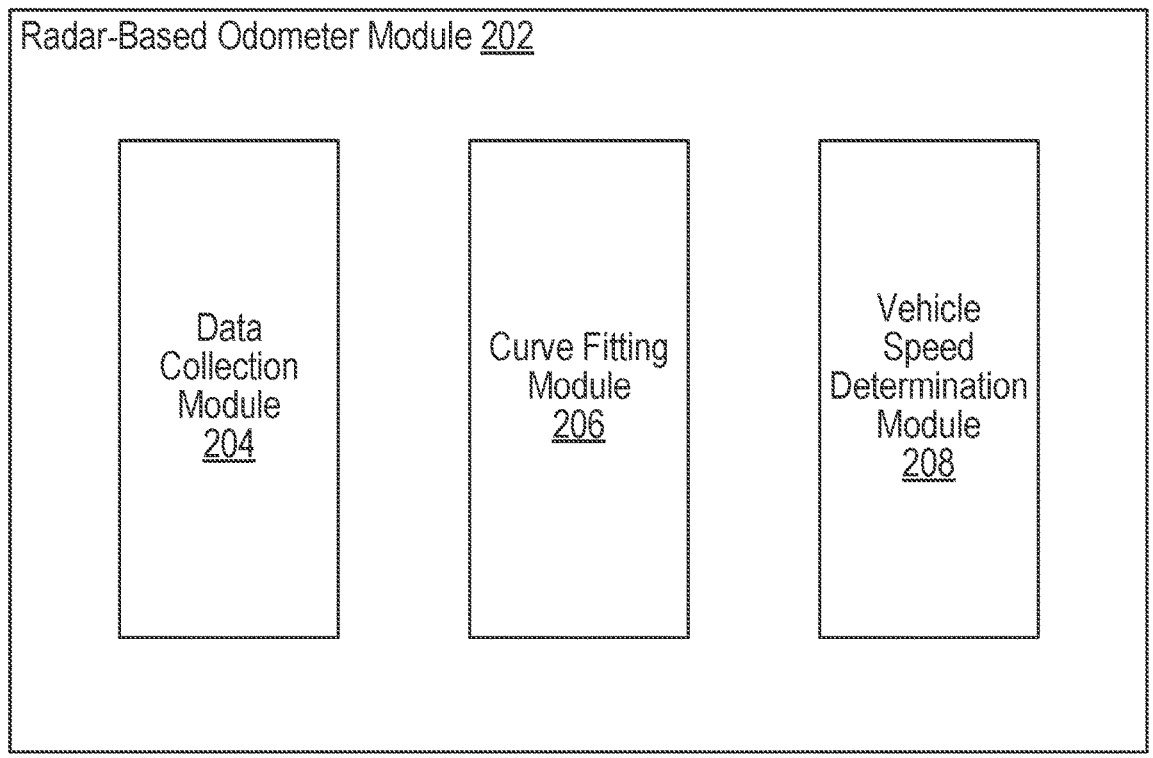
FIG. 2 illustrates an example radar-based odometer module, according to an embodiment of the present technology.
Figure 2:
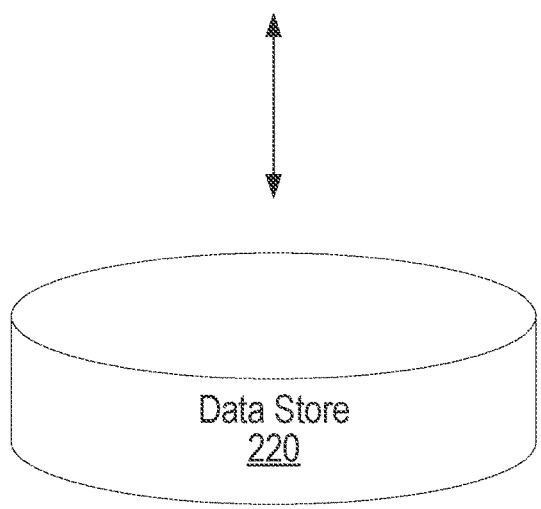

FIG. 2 illustrates an example system 200 including an example radar-based odometer module 202, according to an embodiment of the present technology. As shown in the example of FIG. 2, the radar-based odometer module 202 can include a data collection module 204, a curve fitting module 206, and a vehicle speed determination module 208. In some instances, the example system 200 can include at least one data store 220. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the radar-based odometer module 202 and its sub-modules may be performed by one or more backend computing systems, such as a transportation management system 760 of FIG. 7. In some embodiments, some or all of the functionality performed by the radar-based odometer module 202 and its sub-modules may be performed by one or more computing systems implemented in a vehicle, such as a vehicle 740 of FIG. 7.

The radar-based odometer module 202 can be configured to communicate and operate with the at least one data store 220, as shown in the example system 200. The at least one data store 220 can be configured to store and maintain various types of data. For example, the data store 220 can store frames of data collected by one or more radar systems, including angular positions and measured velocities, and the like. In some embodiments, some or all data stored in the data store 220 can be stored by the transportation management system 760 of FIG. 7. In some embodiments, some or all data stored in the data store 220 can be stored by the vehicle 740 of FIG. 7. More details about information that can be stored in the data store 220 are provided below.

The data collection module 204 can be configured to receive data collected by one or more radar systems on a vehicle. Data collected by a radar system can be grouped into frames of data, with each frame of data representing or being associated with a particular time, such that all data contained in a frame of data was captured by the radar system at approximately the same time. Each frame of data can include a plurality of angular positions relative to the radar system. For example, a position straight ahead of the radar system may correspond to an angular position of 0 degrees (or 0 radians), a position directly to the right of the radar system may correspond to an angular position of 90 degrees (or π/2 radians), and a position directly to the left of the radar system may correspond to an angular position of −90 degrees (−π/2 radians) (or, alternatively, 270 degrees, or 3π/2 radians). A frame of data may also include, for each angular position, a measured velocity measured by the radar system at that angular position at a particular time. The number of angular positions in a frame of data (and, accordingly, the number of measured velocities) may depend upon a resolution or granularity of a particular radar system. For example, certain radar systems may measure velocity for every half degree, or every one degree, or every two degrees, or every five degrees, or every ten degrees. Furthermore, the number of angular positions in a frame of data (and the number of corresponding measured velocities) may depend on a range of view of a particular radar system. Different radar systems may have different angular ranges. For example, one radar system may have a range of view of 90 degrees, while another radar system may have a range of view of 180 degrees, while another radar system may have a range of view of 360 degrees.

The curve fitting module 206 can be configured to fit a curve to a frame of data collected by a radar system. As mentioned above, for stationary objects around a moving vehicle, the Doppler effect indicates that the measured velocity for a stationary object, as measured by a radar system on the vehicle, will be proportional to the speed of the vehicle multiplied by the cosine of the angular position of the stationary object with respect to the radar system, i.e., $v_{measured} \propto v_{vehicle} * \cos(\theta)$. In many instances, many or the majority of objects around a vehicle are stationary objects. As such, in general, the data points in a frame of data generally resemble a cosine curve. Accordingly, in an embodiment, the curve fitting module 206 can be configured to fit a cosine curve to a frame of data captured by a radar system.

Any moving objects around a vehicle (e.g., other vehicles or pedestrians), and detected by a vehicle radar system, may negatively affect how accurately a cosine curve can be fitted to a frame of data captured by the radar system. For example, if all objects around a vehicle are stationary, a frame of data captured by a radar system on the vehicle should very closely match a cosine curve. Conversely, if all objects around the vehicle are moving, then a frame of data captured by the radar system would not resemble a cosine curve since the measured velocities would be dependent on the velocities of the moving objects. In many instances, a vehicle's surroundings may include some objects that are stationary (e.g., a road, a tree, a house, a highway wall, a raised median, etc.), and may also include some objects that are moving (e.g., other vehicles). In certain embodiments, the curve fitting module 206 can be configured to identify one or more data points in a frame of data that are associated with a moving object, and remove the one or more data points from consideration before fitting a cosine curve to the frame of data. In certain embodiments, all data points that are determined to be associated with a moving object can be removed from consideration before fitting a cosine curve to the frame of data, since any data point associated with a moving object could potentially result in a less accurate speed estimate for the vehicle.

In certain embodiments, sensor data from one or more additional sensors on a vehicle can be used to identify data points associated with moving objects. For example, in various embodiments, lidar data collected by one or more lidar systems on a vehicle can be used to identify moving objects around the vehicle. Furthermore, the lidar data can be used to determine the angular positions of the moving objects with respect to a radar system mounted on the vehicle at a given time. For a frame of data collected by the radar system at the given time, any velocity measurements captured by the radar system at the angular positions of the moving objects can be removed from the frame of data to generate a filtered frame of data, and the curve fitting module 206 can fit a cosine curve to the filtered frame of data. Removing data points associated with moving objects in this manner can improve the fit of the fitted cosine curve, and generate a more accurate vehicle speed estimate. While the example of lidar data from one or more lidar systems is given above, other sensors can be used to identify moving objects and their angular position with respect to a vehicle and/or a vehicle radar system. As just one example, image data from one or more cameras can be used to identify moving objects around a vehicle at a given time, and their angular positions with respect to a radar system on the vehicle at the given time. Based on the identification of the moving objects and their angular positions, the moving objects can be removed or filtered from a frame of data to optimize generation of a cosine curve, as described.

The vehicle speed determination module 208 can be configured to estimate the speed of a vehicle based on a cosine curve fitted to a frame of data captured by a radar system on the vehicle. As discussed above, for all stationary objects around a vehicle and detected by a radar system on the vehicle, $v_{measured} \propto v_{vehicle} * \cos(\theta)$, where $v_{measured}$ is the velocity of the stationary object as measured by the radar system, $\theta$ is the angular position of the stationary object with respect to the radar system, and $v_{vehicle}$ is the velocity of the vehicle. If the curve fitting module 206 fits a cosine curve, using $\theta$ as one variable and $v_{measured}$ as a second variable, the velocity of the vehicle can be estimated from the curve. For example, if an equation of the fitted curve is $v_{measured} = 50 * \cos(\theta)$, the value "50" can represent a velocity of the vehicle multiplied by a proportionality constant (which can, for example, be experimentally derived).

In an embodiment, multiple radar systems may be mounted on a vehicle. A plurality of radar systems can be mounted to a vehicle, and each radar system may have a different position and/or a different orientation such that each radar system has a different field of view from the other radar systems mounted to the vehicle. For example, a vehicle may include a first radar system directed towards a front of the vehicle, a second radar system directed towards a left side of the vehicle, a third radar system directed towards a right side of the vehicle, and a fourth radar system directed towards a rear of the vehicle. Each radar system can individually collect frames of data. Since each radar system has a unique field of view, the frames of data captured by the radar systems should also be unique. However, the unique frames of data captured by the multiple radar systems should still result in reasonably similar vehicle speed estimates, since the radar systems are mounted to the same vehicle. In certain embodiments, at a given time, each radar system of the plurality of radar systems can capture a frame of data, and a separate vehicle speed estimate for each radar system of the plurality of radar systems can be generated based on each frame of data. For example, if a vehicle has four radar systems, at a given time, four frames of data can be captured, and four separate vehicle speed estimates can be generated, with each vehicle speed estimate corresponding to a respective one of the four frames of data captured by a respective one of the four radar systems. The vehicle speed determination module 208 can be configured to combine the multiple vehicle speed estimates to generate an overall vehicle speed estimate. For example, a plurality of vehicle speed estimates can be averaged together, or a weighted average can be used, or any other scheme to combine the multiple vehicle speed estimates.

In certain embodiments, each vehicle speed estimate can be associated with a weight, and the overall vehicle speed estimate can be calculated based on the weights. For example, the weights may be used in a weighted average of vehicle speed estimates. In certain embodiments, the weight associated with a vehicle speed estimate may be indicative of a confidence level of the vehicle speed estimate. For example, when a cosine curve is fitted to a particular frame of data, a fit quality metric (or an error metric) can be calculated which indicates how well the cosine curve fits the frame of data. Examples of fit quality metrics include, but are not limited to, sum of squares due to error (SSE), R-square, adjusted R-square, root mean squared error (RMSE), and the like. As discussed above, each vehicle speed estimate may be associated with a particular frame of data. Furthermore, each vehicle speed estimate may be generated based on a cosine curve fitted to the frame of data. As such, the vehicle speed estimate may be associated with both a particular frame of data, and a curve fitted to the frame of data. The weight for a particular vehicle speed estimate may be determined based on a fit quality metric calculated for the cosine curve from which the vehicle speed estimate was derived. In certain embodiments, a fit quality metric indicative of a high quality curve fit may result in a higher weight being assigned to the vehicle speed estimate, while a fit quality metric indicative of a low quality curve fit may result in a lower weight. There may be instances in which vehicle speed estimates from one or more radar systems are ignored completely. This may be the case, for example, if a particular vehicle speed estimate differs from all the other vehicle speed estimates by more than a threshold margin. For example, if three of four radar systems on a vehicle estimate the vehicle speed to be between 30-32 mph, and the fourth radar system estimates the vehicle speed to be 10 mph, a determination can be made that the fourth radar system is malfunctioning, or that the frame of data captured by the fourth radar system is unreliable. In such an instance, the vehicle speed estimate calculated by the fourth radar system may be assigned a weight of zero.

In certain embodiments, the vehicle speed determination module 208 can utilize historical vehicle speed estimate data to constrain a current vehicle speed estimate. For example, the vehicle speed determination module 208 can compare a current vehicle speed estimate with one or more previous vehicle speed estimates (e.g., all vehicle speed estimates in the previous 10 seconds), to see if the current vehicle speed estimate is reasonable given previous vehicle speed estimates. In one example, a constraint may specify a maximum acceleration or deceleration for a vehicle, such that a vehicle speed estimate that results in an acceleration or deceleration that exceeds the maximum may be ignored or discarded.

In certain embodiments, the radar-based vehicle speed estimate determined by the vehicle speed determination module 208 can be used in operation of an autonomous vehicle. In certain embodiments, the radar-based vehicle speed estimate can be utilized in place of a wheel-revolution-based speed estimate (e.g., by a traditional odometer/tachometer/speedometer on a vehicle). For example, the radar-based vehicle speed estimate can be used in place of a vehicle speed estimate by a wheel-revolution-based speedometer if it is determined that the speedometer is not operating properly. In certain embodiments, a radar-based vehicle speed estimate can be compared to a wheel-revolution-based vehicle speed estimate to determine whether one or more odometer and/or speedometer options on a vehicle are functioning properly. In certain embodiments, if it is determined, based on the radar-based vehicle speed estimate, that one or more other odometer and/or speedometer options on a vehicle are not functioning properly, a notification can be generated indicating that the odometer and/or speedometer is malfunctioning and prompting performance of maintenance on the odometer and/or speedometer.

Figure 3A:
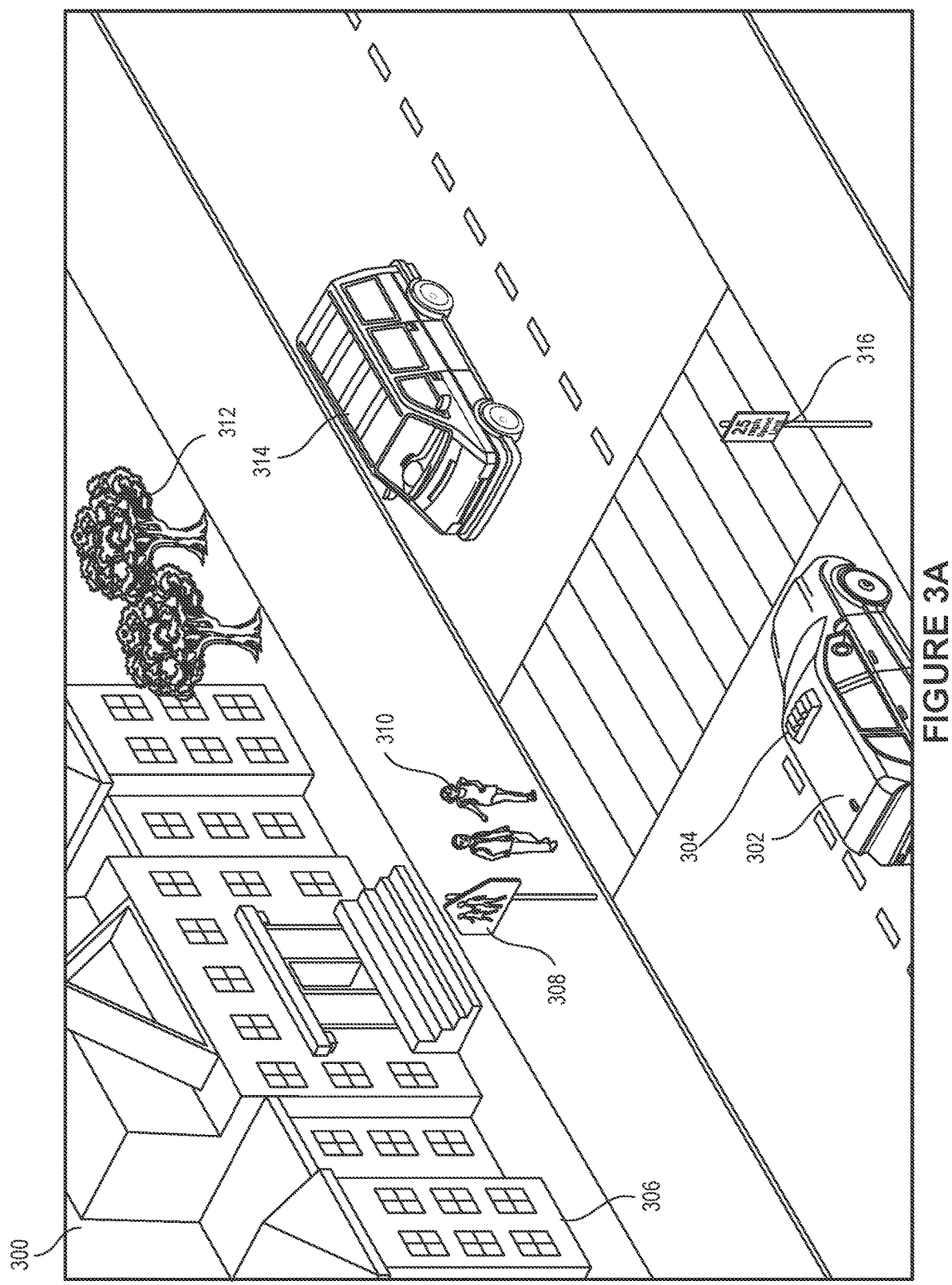
FIGS. 3A-3B illustrate example scenarios, according to an embodiment of the present technology.
Figure 3B:
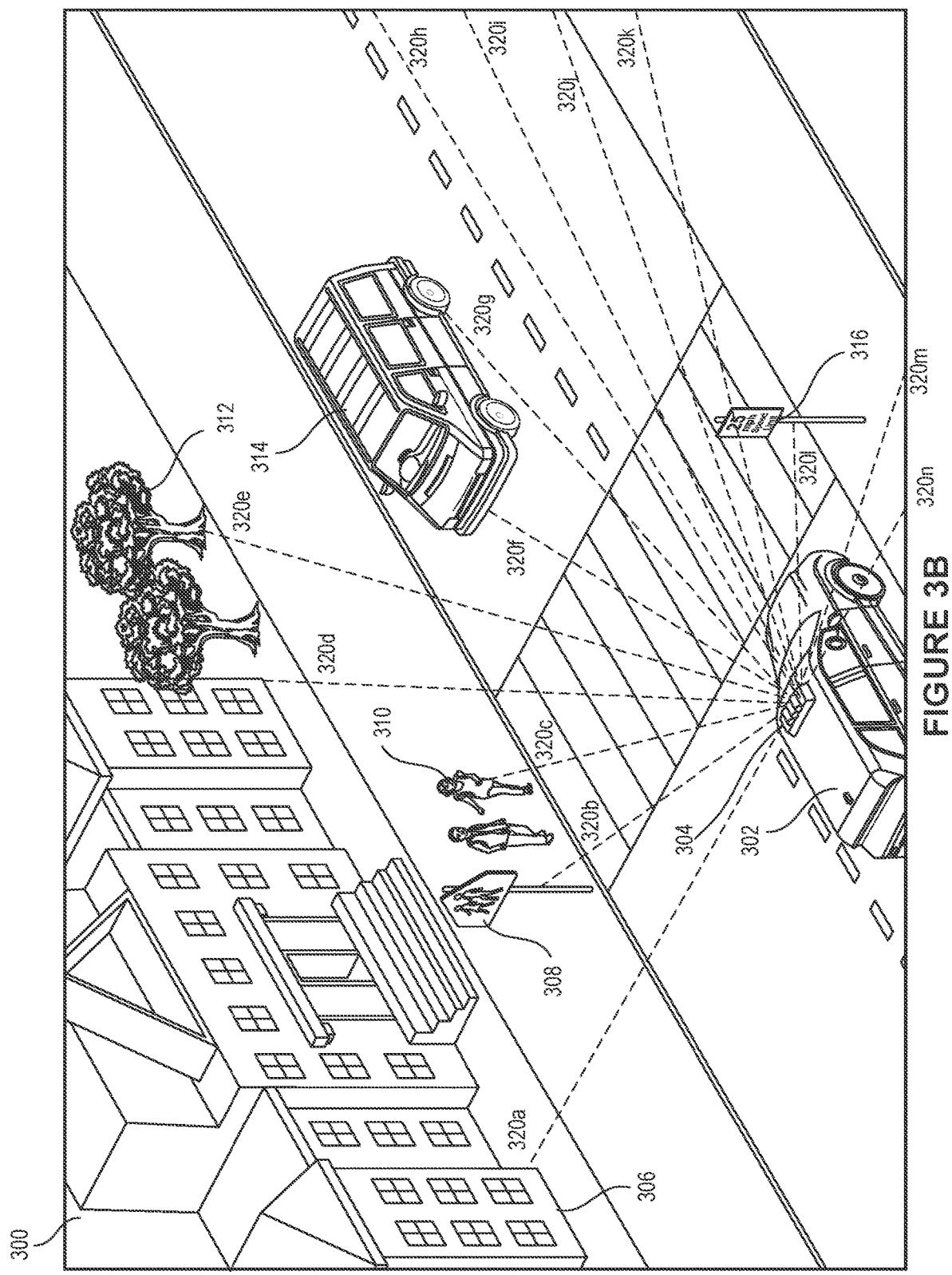
Figure 4A:
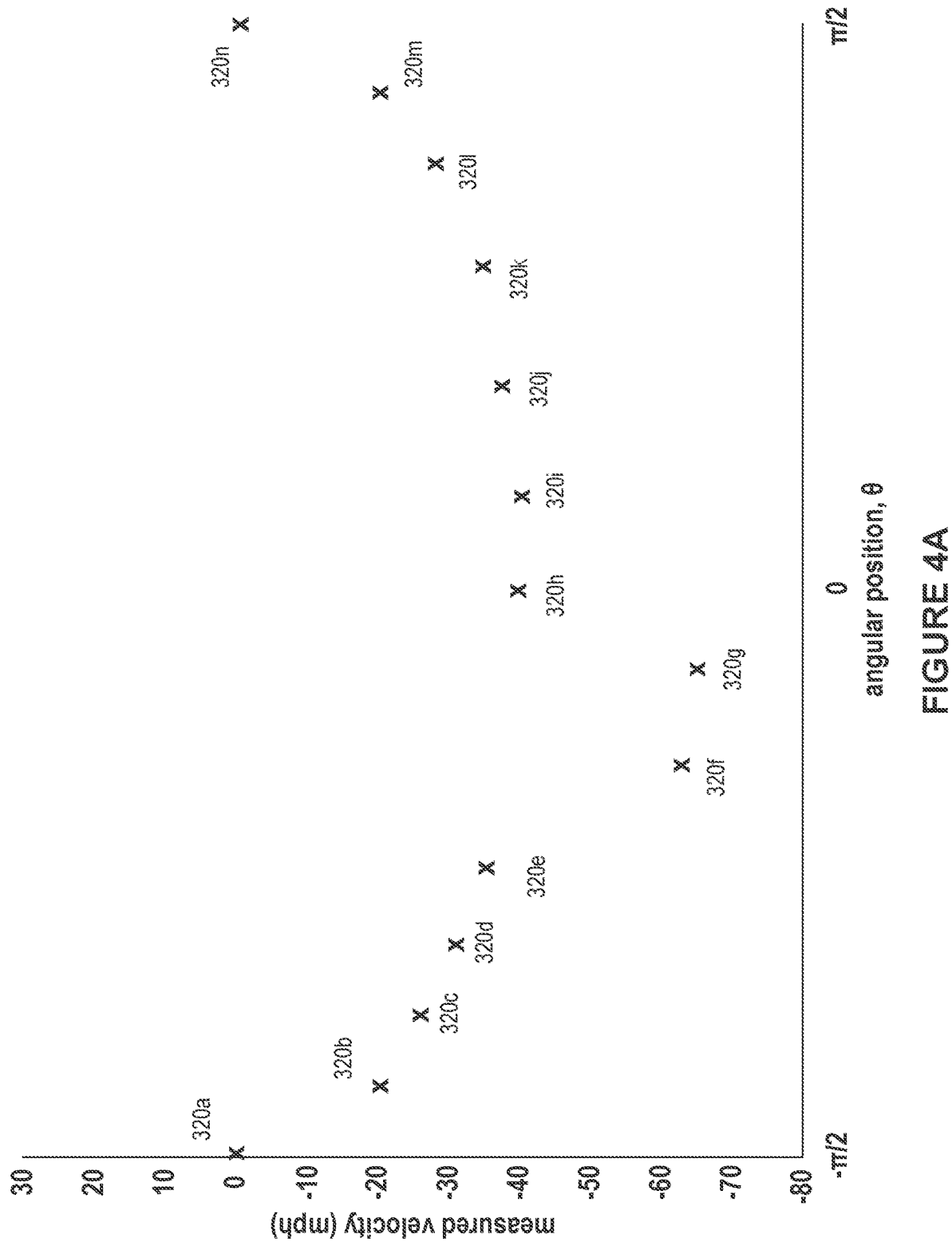
FIGS. 4A-4B illustrate example radar measurements that may be used to estimate vehicle speed, according to various embodiments of the present technology.

FIGS. 3A-3B illustrate an example scenario to illustrate the present technology. FIG. 3A depicts an example scenario in which a vehicle 302 has a radar system 304. As the vehicle 302 travels down a road, the surroundings of the vehicle 302 include a building 306, a cross-walk sign 308, a pedestrian 310, a tree 312, another moving vehicle 314, and a speed limit sign 316. In FIG. 3B, the radar system 304 measures velocity at a plurality of angular positions with respect to the radar system 304. The velocity measurements 320a-n taken at the plurality of angular positions by the radar system 304 are indicated by dotted lines. For a given time, the plurality of measured velocities and angular positions are stored as a frame of data captured by the radar system 304. A sample frame of data from the example scenario in FIGS. 3A-3B is depicted in FIG. 4A, which will be discussed in greater detail below. Some of the measured velocities correspond to stationary objects, and some correspond to moving objects. For example, velocity measure 320a measures a measured velocity of the stationary building 306, and velocity measure 320e measures a measured velocity of the stationary tree 312, while velocity measures 320f and 320g measure a measured velocity of various portions of the moving vehicle 314. The measured velocity for each of the stationary objects is non-zero due to the movement of the vehicle 302 and the radar system 304 relative to the stationary objects. The measured velocities for all stationary objects will resemble a cosine curve. However, measured velocities for any moving objects will deviate from the cosine curve, since the measured velocities will depend not only on the speed of the vehicle 302, but also the speed and direction of the moving object. In certain embodiments, as described above, any measured velocities associated with moving objects may be removed from consideration before a cosine curve is fitted to the frame of data, as these data points may result in a less accurate speed estimate for the vehicle 302. In certain embodiments, sensor data from one or more sensors on a vehicle (e.g., the vehicle 302) can be used to identify moving objects, and to remove data points associated with moving objects. For example, in the example scenario shown in FIG. 3B, lidar data from a lidar system on the vehicle 302 can be used to determine that the vehicle 314 is a moving object. Lidar data can be used to determine the angular position of the vehicle 314 with respect to the vehicle 302 (e.g., a range of angular positions associated with the moving vehicle 314). Any velocity measurements that are associated with angular positions that fall within the range of angular positions associated with the moving vehicle 314 (or any other moving object) may be removed from consideration when estimating the speed of the vehicle 302 in order to generate a more accurate speed estimate.

Figure 4B:
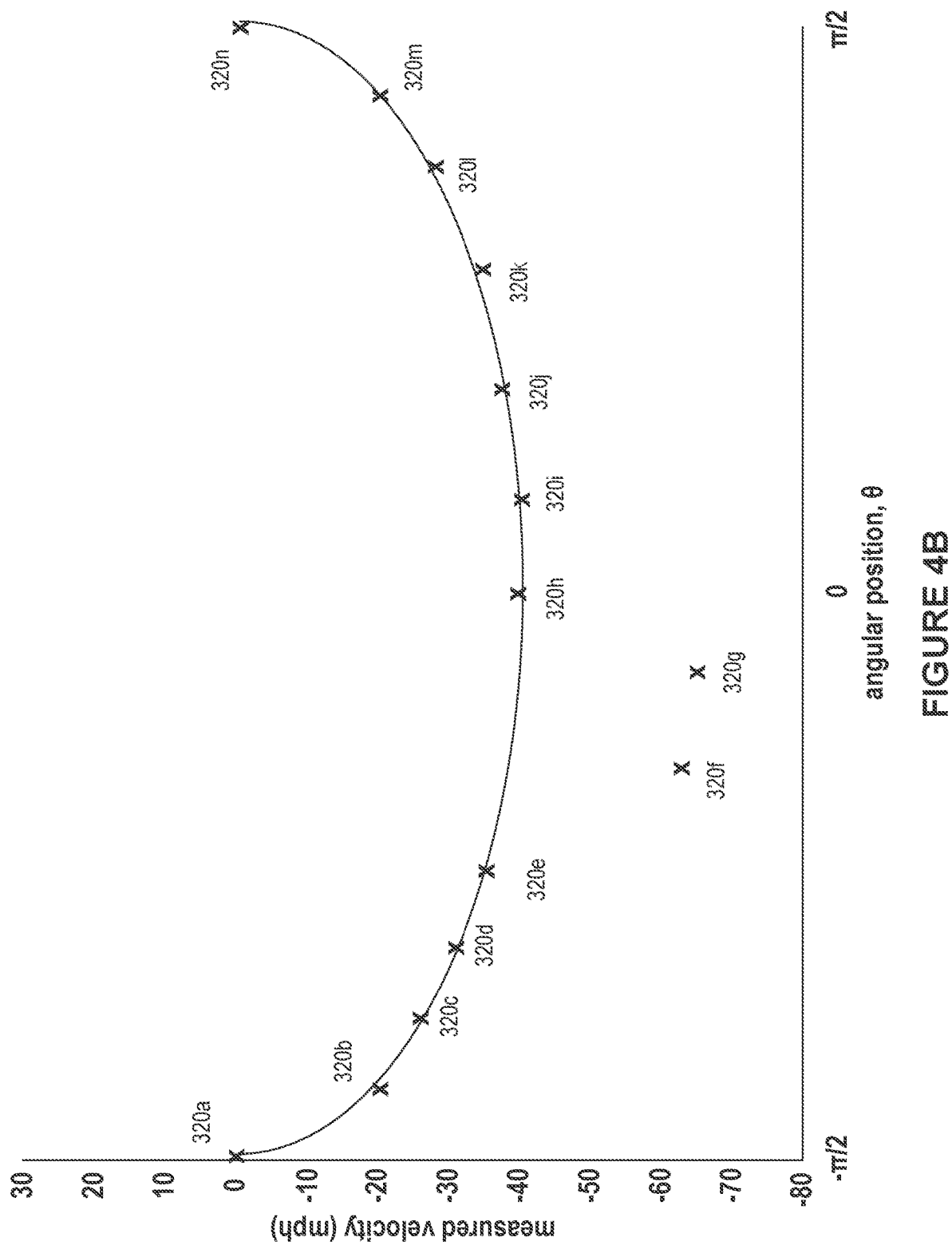

FIGS. 4A-4B illustrate an example set of data captured by a radar system on a vehicle to illustrate various features of the present technology. The set of data depicted in FIGS. 4A-4B corresponds to the velocity measurements 320a-n of FIG. 3B. The example set of data (e.g., a frame of data) includes angular positions on the x-axis, and measured velocities on the y-axis. A plurality of angular positions are shown, and each angular position is associated with a single measured velocity. As can be seen in the figures, velocity measurement 320a, positioned directly to the left of the vehicle 302, is positioned along the x-axis at angular position $-\pi/2$, velocity measurement 320h, positioned directly in front of the vehicle 302, is positioned along the x-axis at angular position 0, and velocity measurement 320n, positioned directly to the right of the vehicle 302, is positioned along the x-axis at angular position $\pi/2$. The velocity measurements 320a-n are shown in FIG. 4A as having negative velocities because the objects around the vehicle 302 appear, from the perspective of the vehicle 302, to be moving backwards (e.g., from the front of the vehicle 302 to the back of the vehicle 302). Other objects could have a positive measured velocity if, for example, they were moving in the same direction as the vehicle 302 at a greater speed than the vehicle 302. The majority of the data points 320a-n appear to fit a cosine curve. However, velocity measurements 320f and 320g, which correspond to velocity measurements of the moving vehicle 314 depicted in FIGS. 3A and 3B, appear to be outliers. This is because the vehicle 314 is a moving object. The vehicle 314 is moving in a direction opposite the vehicle 302. As such, the measured velocities 320f, 320g are greater than they would have been had they been associated with a stationary object. As discussed above, any data points that are determined to be associated with moving objects can be removed from the set of data before fitting a cosine curve to the data. In FIG. 4B, velocity measurements 320f, 320g are excluded when a cosine curve is fitted to the set of data. A speed of the vehicle can be estimated based on the fitted cosine curve. For example, the example cosine curve in FIG. 4B appears to have the equation: measured velocity=40*cosine(theta). In this example scenario, the speed of the vehicle can be estimated to be approximately 40 mph.

Figure 5:
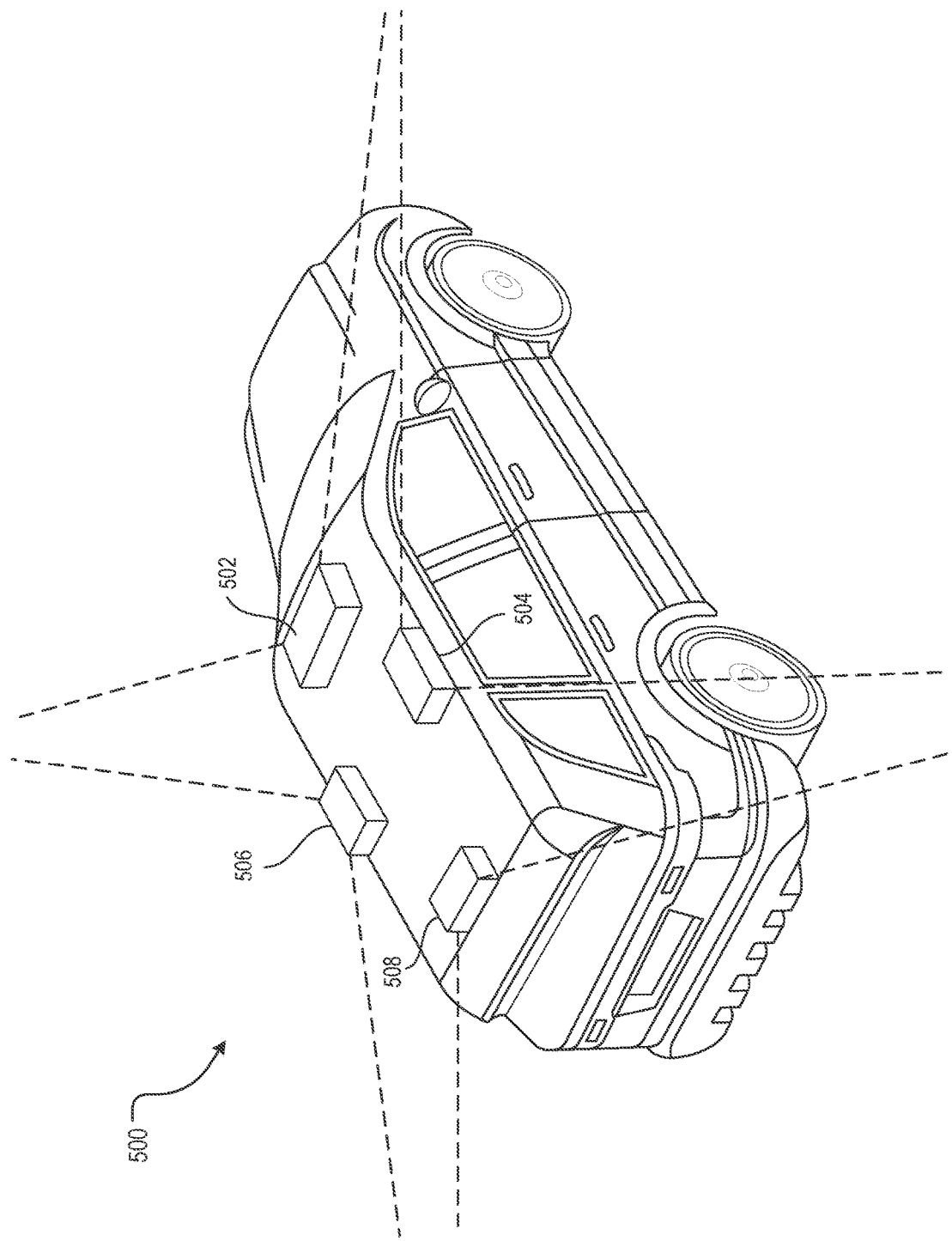
FIG. 5 illustrates an example vehicle, according to an embodiment of the present technology.

FIG. 5 illustrates an example vehicle 500, according to an embodiment of the present technology. The vehicle 500 includes four radar systems 502, 504, 506, 508. A first radar system 502 is positioned at a first position at a front portion of the roof of the vehicle 500, and is oriented to face the front of the vehicle 500. A second radar system 504 is positioned at a second position on a right side of the roof of the vehicle 500, and is oriented to face the right of the vehicle 500. A third radar system 506 is positioned at a third position on a left side of the roof of the vehicle 500, and is oriented to face the left of the vehicle 500. A fourth radar system 508 is positioned at a fourth position on a rear portion of the roof of the vehicle 500, and is oriented to face the rear of the vehicle 500. The field of view of each radar system is depicted using dotted lines. It can be seen that each radar system has a unique field of view relative to the other radar systems. As such, each radar system will detect different objects at different angular positions, and will generate unique frames of data. In an embodiment, each frame of data can be used to generate a separate vehicle speed estimate, such that at any given time, four estimates are generated by the radar systems 502. 504, 506, 508 for the speed of the vehicle at the given time. The four vehicle speed estimates can be combined to generate an overall vehicle speed estimate. For example, consider an example scenario in which, at a given time, a frame of data captured by the radar system 502 resulted in a speed estimate of 30.4 mph, a frame of data captured by the radar system 504 resulted in a speed estimate of 31.1 mph, a frame of data captured by the radar system 506 resulted in a speed estimate of 30.7 mph, and a frame of data captured by the radar system 508 resulted in a speed estimate of 28.0 mph. These speed estimates can be combined (e.g., averaged) to determine an estimated speed for the vehicle 500. In certain embodiments, each of the separate speed estimates can be weighted, and the various speed estimates can be combined into a single speed estimate based on the weights (e.g., a weighted average). In certain embodiments, vehicle speed estimates from one or more radar systems may be ignored completely. For example, if it is determined that the speed estimate of the radar system 508 differs from the other speed estimates by more than a threshold margin, the speed estimate of the radar system 508 may be disregarded altogether, and the other three speed estimates can be combined to generate an overall speed estimate for the vehicle 500. Many variations are possible.

Figure 6:
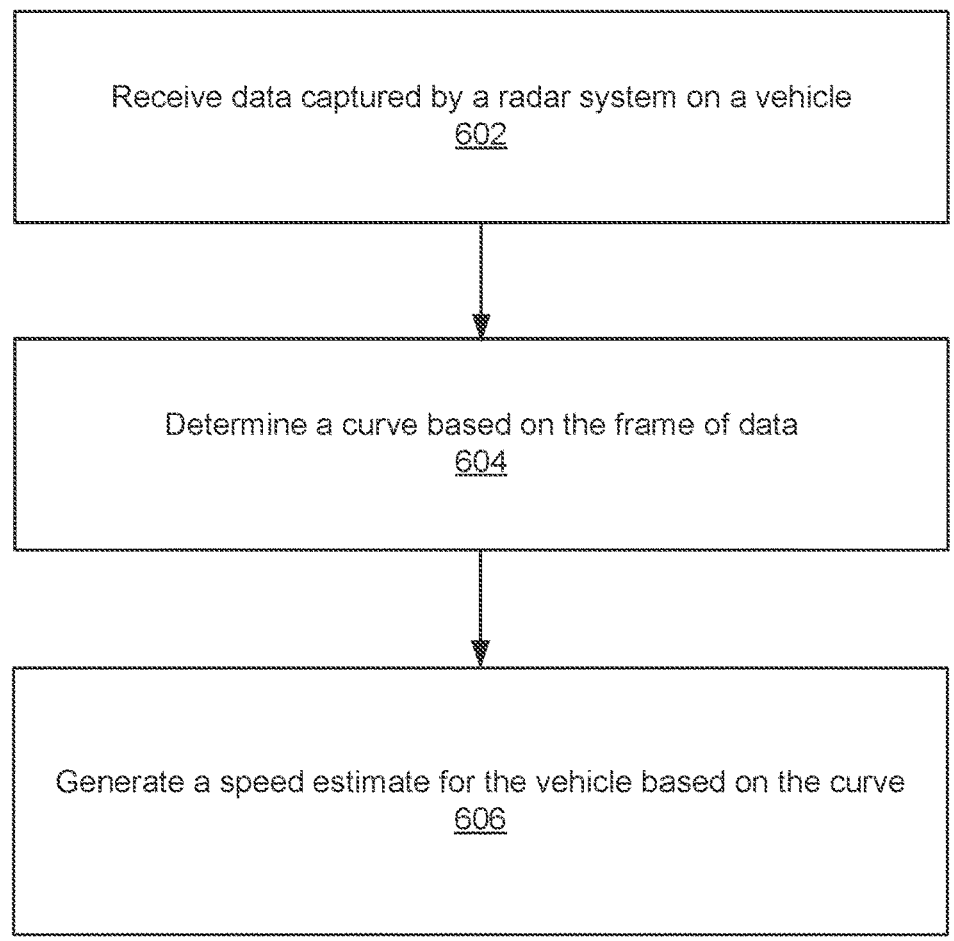
FIG. 6 illustrates an example method, according to an embodiment of the present technology.

FIG. 6 illustrates an example method 600, according to an embodiment of the present technology. At block 602, the example method 600 can receive data captured by a radar system on a vehicle. At block 604, the example method 600 can determine a curve based on the frame of data. At block 606, the example method 600 can generate a speed estimate for the vehicle based on the cosine curve.

Many variations to the example method are possible. It should be appreciated that there can be additional, fewer, or alternative steps performed in similar or alternative orders, or in parallel, within the scope of the various embodiments discussed herein unless otherwise stated.

Figure 7:
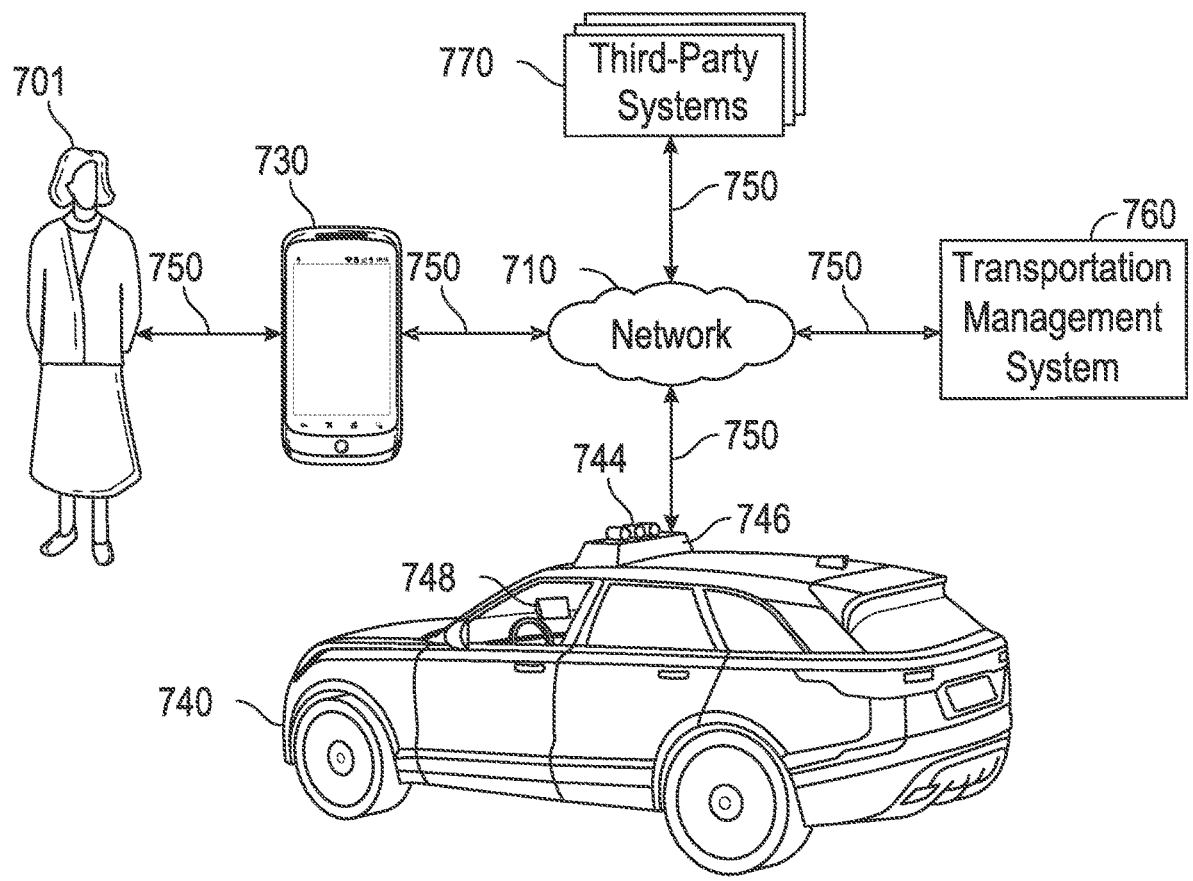
FIG. 7 illustrates an example block diagram of a transportation management environment, according to an embodiment of the present technology.

FIG. 7 illustrates an example block diagram of a transportation management environment for matching ride requestors with vehicles. In particular embodiments, the environment may include various computing entities, such as a user computing device 730 of a user 701 (e.g., a ride provider or requestor), a transportation management system 760, a vehicle 740, and one or more third-party systems 770. The vehicle 740 can be autonomous, semi-autonomous, or manually drivable. The computing entities may be communicatively connected over any suitable network 710. As an example and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. As an example and not by way of limitation, the network environment may include multiple users 701, user devices 730, transportation management systems 760, vehicles 740, third-party systems 770, and networks 710. In some embodiments, some or all modules of the radar-based odometer module 202 may be implemented by one or more computing systems of the transportation management system 760. In some embodiments, some or all modules of the radar-based odometer module 202 may be implemented by one or more computing systems in the vehicle 740.

The user device 730, transportation management system 760, vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, etc.), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP). FIG. 7 illustrates transmission links 750 that connect user device 730, vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 750. For example, the user device 730 may communicate with the transportation management system via a cellular network and the Internet, but communicate with the vehicle 740 via Bluetooth or a physical wire connection.

In particular embodiments, the transportation management system 760 may fulfill ride requests for one or more users 701 by dispatching suitable vehicles. The transportation management system 760 may receive any number of ride requests from any number of ride requestors 701. In particular embodiments, a ride request from a ride requestor 701 may include an identifier that identifies the ride requestor in the system 760. The transportation management system 760 may use the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In particular embodiments, ride requestor information may include profile information about a particular ride requestor 701. In particular embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 760 may classify a user 701 based on known information about the user 701 (e.g., using machine-learning classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. As an example and not by way of limitation, when the transportation management system 760 receives a request to travel from San Francisco International Airport (SFO) to Palo Alto, Calif., the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 760. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 760 in particular embodiments may predict and provide ride suggestions in response to a ride request. In particular embodiments, the system 760 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 760 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In particular embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In particular embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In particular embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are required to access the third-party system 770, the user 701 may provide such information to the transportation management system 760, which may serve as a proxy for accessing content from the third-party system 770.

In particular embodiments, user device 730 may be a mobile computing device such as a smartphone, tablet computer, or laptop computer. User device 730 may include one or more processors (e.g., CPU, GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and 2G/3G/4G/LTE mobile communication standard. User device 730 may also include one or more cameras, scanners, touchscreens, microphones, speakers, and any other suitable input-output devices.

In particular embodiments, the vehicle 740 may be equipped with an array of sensors 744, a navigation system 746, and a ride-service computing device 748. In particular embodiments, a fleet of vehicles 740 may be managed by the transportation management system 760. The fleet of vehicles 740, in whole or in part, may be owned by the entity associated with the transportation management system 760, or they may be owned by a third-party entity relative to the transportation management system 760. In either case, the transportation management system 760 may control the operations of the vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In particular embodiments, the vehicles 740 may receive data from and transmit data to the transportation management system 760 and the third-party system 770. Examples of received data may include, e.g., instructions, new software or software updates, maps, 3D models, trained or untrained machine-learning models, location information (e.g., location of the ride requestor, the vehicle 740 itself, other vehicles 740, and target destinations such as service centers), navigation information, traffic information, weather information, entertainment content (e.g., music, video, and news) ride requestor information, ride information, and any other suitable information. Examples of data transmitted from the vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and third-party system 770), and any other suitable data.

In particular embodiments, vehicles 740 may also communicate with each other, including those managed and not managed by the transportation management system 760. For example, one vehicle 740 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 760 or third-party system 770), or both.

In particular embodiments, a vehicle 740 may obtain and process sensor/telemetry data. Such data may be captured by any suitable sensors. For example, the vehicle 740 may have a Light Detection and Ranging (LiDAR) sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 740. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In particular embodiments, the vehicle may be equipped with stereo vision for, e.g., spotting hazards such as pedestrians or tree branches on the road. As another example, the vehicle 740 may have radars for, e.g., detecting other vehicles and hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on the vehicle 740 in FIG. 7, sensors 744 may be located in any suitable location in or on the vehicle 740. Example locations for sensors include the front and rear bumpers, the doors, the front windshield, on the side panel, or any other suitable location.

In particular embodiments, the vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest.

In particular embodiments, the vehicle 740 may have a navigation system 746 responsible for safely navigating the vehicle 740. In particular embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 746 may use its determinations to control the vehicle 740 to operate in prescribed manners and to guide the vehicle 740 to its destinations without colliding into other objects. Although the physical embodiment of the navigation system 746 (e.g., the processing unit) appears in a particular location on the vehicle 740 in FIG. 7, navigation system 746 may be located in any suitable location in or on the vehicle 740. Example locations for navigation system 746 include inside the cabin or passenger compartment of the vehicle 740, near the engine/battery, near the front seats, rear seats, or in any other suitable location.

In particular embodiments, the vehicle 740 may be equipped with a ride-service computing device 748, which may be a tablet or any other suitable device installed by transportation management system 760 to allow the user to interact with the vehicle 740, transportation management system 760, other users 701, or third-party systems 770. In particular embodiments, installation of ride-service computing device 748 may be accomplished by placing the ride-service computing device 748 inside the vehicle 740, and configuring it to communicate with the vehicle 740 via a wired or wireless connection (e.g., via Bluetooth). Although FIG. 7 illustrates a single ride-service computing device 748 at a particular location in the vehicle 740, the vehicle 740 may include several ride-service computing devices 748 in several different locations within the vehicle. As an example and not by way of limitation, the vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 748 may be detachable from any component of the vehicle 740. This may allow users to handle ride-service computing device 748 in a manner consistent with other tablet computing devices. As an example and not by way of limitation, a user may move ride-service computing device 748 to any location in the cabin or passenger compartment of the vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
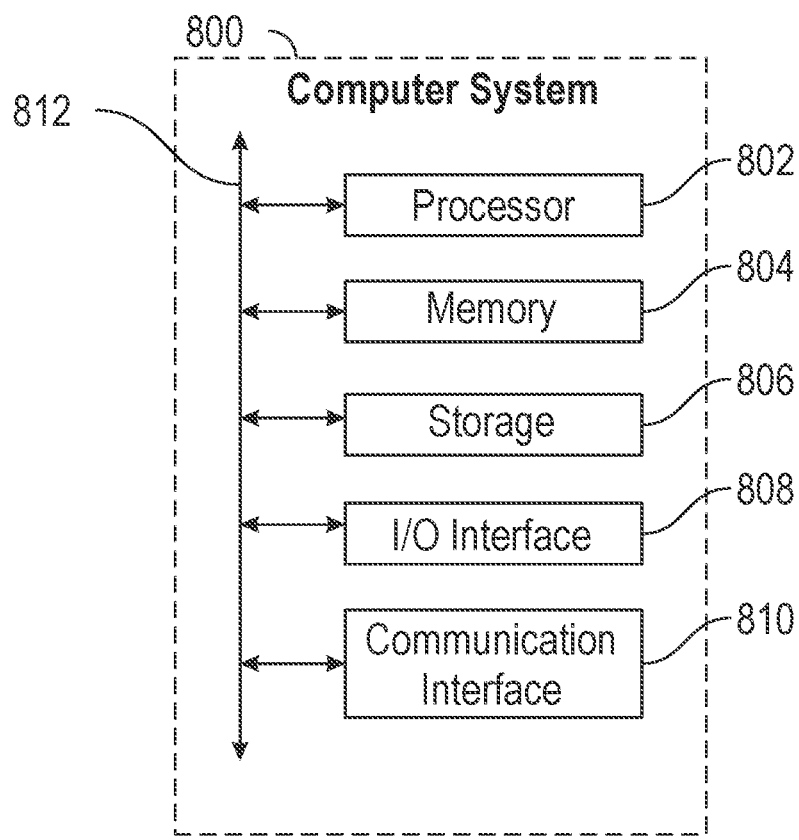
FIG. 8 illustrates an example of a computer system or computing device that can be utilized in various scenarios, according to an embodiment of the present technology.

FIG. 8 illustrates an example computer system 800. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware or software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware or software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware or software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
receiving, by a computing system of a vehicle, a first frame of data generated by a first sensor of the vehicle, the first frame of data including a first set of angular positions associated with a first set of objects in an environment of the vehicle;
receiving, by the computing system, a second frame of data generated by a second sensor of the vehicle, the second frame of data including a second set of angular positions associated with a second set of objects in the environment;
generating, by the computing system, a speed estimate for the vehicle in relation to the first set of objects and the second set of objects based at least in part on the first set of angular positions of the first frame of data and the second set of angular positions of the second frame of data; and
controlling the vehicle according to the speed estimate.

2. The computer-implemented method of claim 1, further comprising:
determining whether one or more angular positions of at least one of the first set of angular positions or the second set of angular positions are associated with a moving object; and
subsequent to determining that the one or more of the angular positions are associated with the moving object, filtering out the one or more angular positions from at least one of the first frame of data or the second frame of data.

3. The computer-implemented method of claim 2, wherein the first frame of data is associated with a first field-of-view and the second frame of data is associated with a second field-of-view different than the first field-of-view.

4. The computer-implemented method of claim 1, wherein a speed of the vehicle and speeds of objects of the first set of objects and the second set of objects are associated with a scenario occurring in the environment of the vehicle.

5. The computer-implemented method of claim 1, wherein the generating the speed estimate comprises:
generating a first speed estimate based on the first set of angular positions of the first frame of data;
generating a second speed estimate based on the second set of angular positions of the second frame of data; and
combining the first speed estimate and the second speed estimate.

6. The computer-implemented method of claim 5, wherein:
the first sensor is a first radar system,
the second sensor is a second radar system, and
the first frame of data and the second frame of data are captured at the same time.

7. The computer-implemented method of claim 5, further comprising:
weighting at least one of the first speed estimate or the second speed estimate before the combining of the first speed estimate and the second speed estimate.

8. The computer-implemented method of claim 1, wherein generating the speed estimate for the vehicle comprises:
fitting a curve to the first set of angular positions included in the first frame of data and the second set of angular positions included in the second frame of data.

9. The computer-implemented method of claim 8, further comprising:
determining a fit quality metric for the curve; and
determining a weight based on the fit quality metric.

10. The computer-implemented method of claim 9, wherein the fit quality metric is at least one of a sum of squares due to error (SSE), an R-square, an adjusted R-square, or a root mean squared error (RMSE).

11. A system comprising;
at least one processor; and
a memory storing instructions that, when executed by the at least one processor, cause the system to perform steps comprising:
receiving a first frame of data generated by a first sensor of a vehicle, the first frame of data including a first set of angular positions associated with a first set of objects in an environment of the vehicle;
receiving a second frame of data generated by a second sensor of the vehicle, the second frame of data including a second set of angular positions associated with a second set of objects in the environment;
generating a speed estimate for the vehicle in relation to the first set of objects and the second set of objects based at least in part on the first set of angular positions of the first frame of data and the second set of angular positions of the second frame of data; and
controlling the vehicle according to the speed estimate.

12. The system of claim 11, wherein the instructions cause the system to perform the steps further comprising:
determining whether one or more angular positions of at least one of the first set of angular positions or the second set of angular positions are associated with a moving object; and
subsequent to determining that the one or more of the angular positions are associated with the moving object, filtering out the one or more angular positions from at least one of the first frame of data or the second frame of data.

13. The system of claim 12, wherein the first frame of data is associated with a first field-of-view and the second frame of data is associated with a second field-of-view different than the first field-of-view.

14. The system of claim 11, wherein a speed of the vehicle and speeds of objects of the first set of objects and the second set of objects are associated with a scenario occurring in the environment of the vehicle.

15. The system of claim 11, wherein the generating the speed estimate comprises:
generating a first speed estimate based on the first set of angular positions of the first frame of data;
generating a second speed estimate based on the second set of angular positions of the second frame of data; and
combining the first speed estimate and the second speed estimate.

16. A non-transitory computer-readable medium comprising computer-executable instructions that, when executed by at least one processor of a computing device, cause the computing device to perform steps comprising:
receiving a first frame of data generated by a first sensor of a vehicle, the first frame of data including a first set of angular positions associated with a first set of objects in an environment of the vehicle;
receiving a second frame of data generated by a second sensor of the vehicle, the second frame of data including a second set of angular positions associated with a second set of objects in the environment; and
generating a speed estimate for the vehicle in relation to the first set of objects and the second set of objects based at least in part on the first set of angular positions of the first frame of data and the second set of angular positions of the second frame of data; and
controlling the vehicle according to the speed estimate.

17. The non-transitory computer-readable medium of claim 16, wherein the instructions cause the computing device to perform the steps further comprising:
determining whether one or more angular positions of at least one of the first set of angular positions or the second set of angular positions are associated with a moving object; and
subsequent to determining that the one or more of the angular positions are associated with the moving object, filtering out the one or more angular positions from at least one of the first frame of data or the second frame of data.

18. The non-transitory computer-readable medium of claim 17, first frame of data is associated with a first field-of-view and the second frame of data is associated with a second field-of-view different than the first field-of-view.

19. The non-transitory computer-readable medium of claim 16, wherein a speed of the vehicle and speeds of objects of the first set of objects and the second set of objects are associated with a scenario occurring in the environment of the vehicle.

20. The non-transitory computer-readable medium of claim 16, wherein the generating the speed estimate comprises:
generating a first speed estimate based on the first set of angular positions of the first frame of data;
generating a second speed estimate based on the second set of angular positions of the second frame of data; and
combining the first speed estimate and the second speed estimate.

* * * * *